N. ROBINET.
COTTON CHOPPER.
APPLICATION FILED APR. 14, 1908.
940,279.
Patented Nov. 16, 1909.
2 SHEETS—SHEET 1.
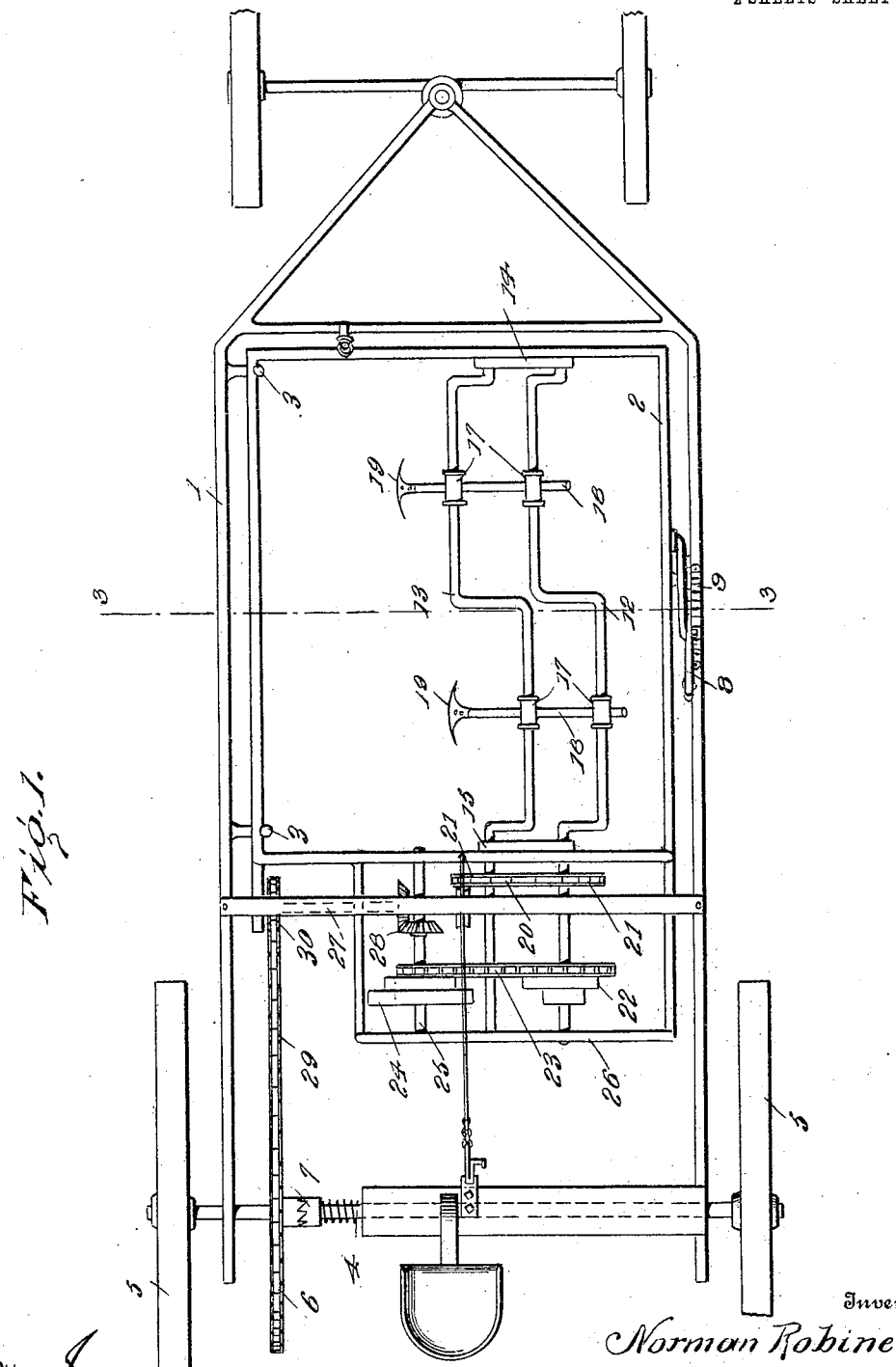
Witnesses
Inventor
Norman Robinet.
By
Attorneys

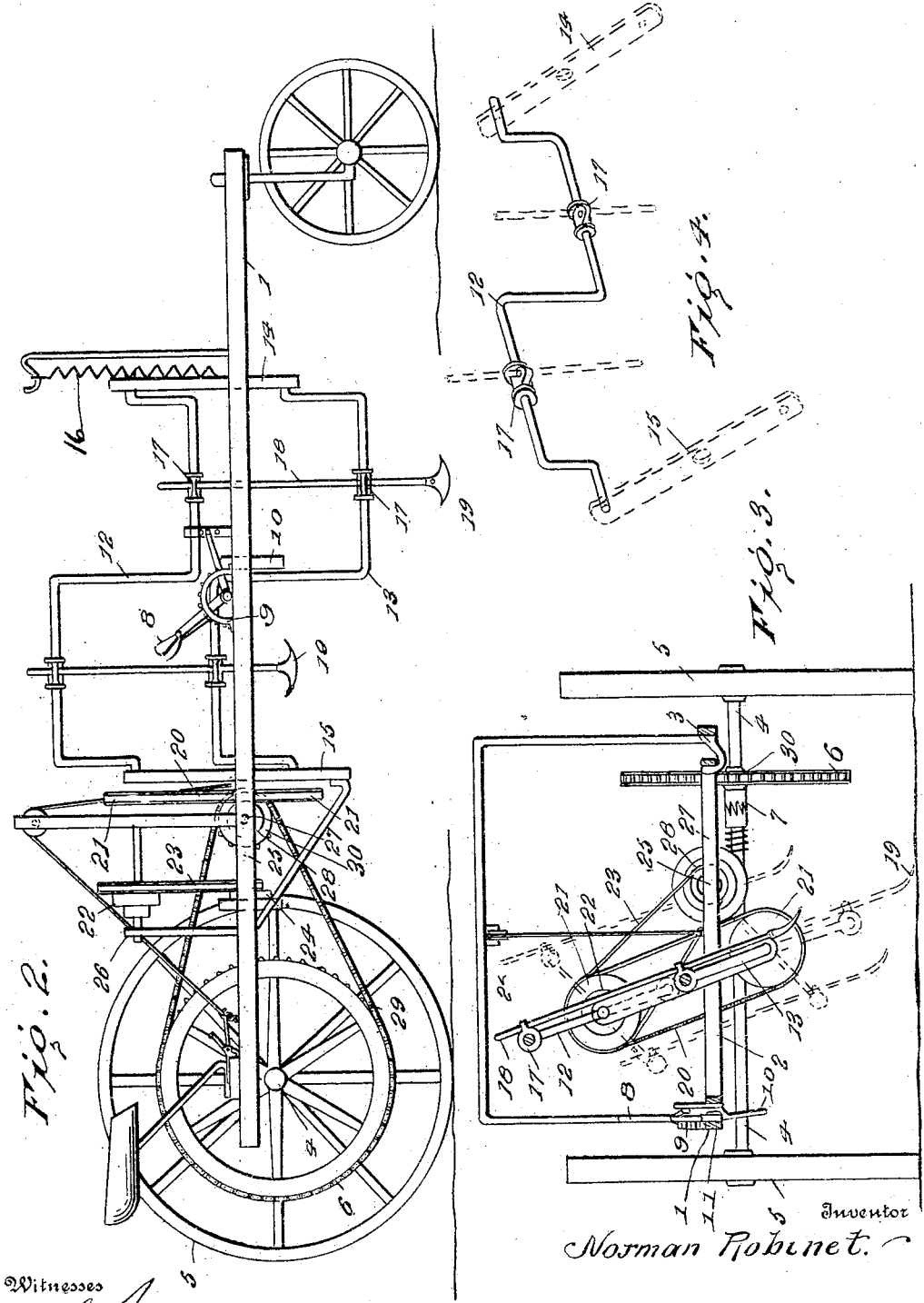

UNITED STATES PATENT OFFICE.

NORMAN ROBINET, OF TONKAWA, OKLAHOMA.

COTTON-CHOPPER.

940,279.  Specification of Letters Patent.  Patented Nov. 16, 1909.

Application filed April 14, 1908. Serial No. 427,041.

*To all whom it may concern:*

Be it known that I, NORMAN ROBINET, citizen of the United States, residing at Tonkawa, in the county of Kay and State of Oklahoma, have invented certain new and useful Improvements in Cotton-Choppers, of which the following is a specification.

The purpose of the present invention is to provide an implement of novel structure particularly designed for thinning rows of cotton plants and embodying mechanism for chopping the plants to be destroyed so as to prevent maturing and crowding the plants to be left standing and produce the crop.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a top plan view of a cotton chopper embodying the invention. Fig. 2 is a side elevation thereof. Fig. 3 is a transverse section on the line 3—3 of Fig. 1, looking to the rear. Fig. 4 is a detail perspective view of a crank shaft and the sleeves mounted on the crank portions thereof to receive the standards provided with the chopping blades.

Corresponding and like parts are referred to in the following description and indicated in all the views of the drawings by the same reference characters.

The machine embodies a main frame 1 and a pivoted frame 2 hinged at one side to the main frame at 3 and adjustable at the opposite side by suitable means. The side bars of the main frame converge at their front ends and may be connected with the front axle in any accustomed way to admit of said axle turning to properly steer the machine when in operation. The rear axle 4 is provided with supporting wheels 5 which may also act as drivers for operating the chopping mechanism. A sprocket wheel 6 is mounted upon the axle 4 and is adapted to be connected therewith by means of a suitable clutch 7. For adjusting the pivoted frame 2, an operating lever 8 is provided and mounted upon the main frame 1 and is supplied with a hand latch which coöperates with a notched bar 9 to hold the pivoted frame in the adjusted position. A guide 10 in conjunction with a keeper 11, prevents relative movement of the pivoted frame in its adjustments and directs the same when moved to raise or lower the chopping mechanism.

A crank shaft 12 is mounted at or near its ends in the upper ends of bars 14 and 15 attached to cross bars of the pivoted frame 2 and a companion crank shaft 13 is mounted at or near its ends in the lower ends of said bars 14 and 15 which incline to the perpendicular in the same direction so as to throw the crank shaft 13 out of vertical line with the crank shaft 12. Springs 16 are interposed between the lower ends of the bars 14 and 15 and the main frame and serve to sustain the weight of the pivoted frame and parts carried thereby with the result that adjustment of said frame may be easily effected. Sleeves 17 are loosely mounted upon the crank portions of the crank shafts 12 and 14 and receive standards 18 which are provided at their lower ends with chopping blades 19 of any formation. By having the crank shafts 12 and 13 arranged out of vertical alinement, the standards 18 normally incline to the perpendicular, thereby enabling the blades 19 to perform their work more effectively and advantageously. In the operation of the machine, the crank shafts 12 and 13 are rotated at a like speed and by having the standards 18 mounted upon the crank portions thereof, said standards are raised and lowered and carried across the rows of plants, with the result that the portions thereof operated upon by the blades 19 are chopped down or killed.

A sprocket chain 20 is supported upon sprocket wheels 21 fast to end portions of the crank shafts 12 and 13 and transmits motion from one to the other. A speed gear 22 is fast to an end portion of the crank shaft 12 and a sprocket chain 23 connects the same with a speed gear 24 fast to a shaft 25 paralleling the crank shafts and journaled in an end bar of the pivoted frame 2 and an auxiliary bar 26 spaced therefrom. A transverse shaft 27 is mounted in bearings of the pivoted frame 2 and is connected with the shaft 25 by means of bevel gear 28, the elements of which are fast to, respectively, the shaft 25 and 27. A sprocket chain 29 connects the sprocket gear 6 with the sprocket pinion 30 fast to the outer end of the transverse shaft 27.

As the machine is moved over the field, the crank shafts 12 and 13 are rotated by the intermediate connections between them and the rear drive axle 4, with the result that the chopping blades 19 are lowered upon one side of the row of plants and are carried across the same destroying the plants to be removed, and said blades, after performing their work, are lifted upon the opposite side of the row and again returned to an operative position; the blades when lowered sweep across the rows and thin the same and then rise and clear the plants when returning to an operative position.

Having thus described the invention, what is claimed as new is:

1. In an implement of the character described for thinning rows of plants, the combination of a main frame mounted upon supporting wheels, a supplemental frame hinged at one side to a side of the main frame and free to move at its opposite side, means mounted upon the main frame for moving the supplemental frame vertically at its free side and securing the same in an adjusted position, and chopping mechanism mounted upon said supplemental frame.

2. In combination a main frame mounted upon wheels, one of which constitutes a driver, a supplemental frame pivoted at one side to the main frame and adjustable vertically at its opposite side, chopping mechanism carried by the supplemental frame, a transverse shaft mounted on the supplemental frame, means for transmitting motion from said transverse shaft to the chopping mechanism, and connecting means between said transverse shaft and the said driver, said connecting means being arranged about in line with the axis of the supplemental member.

In testimony whereof I affix my signature in presence of two witnesses.

NORMAN ROBINET. [L. S.]

Witnesses:
W. W. GREGORY,
R. M. DICK.